(12) United States Patent
Pratt et al.

(10) Patent No.: US 7,019,618 B2
(45) Date of Patent: Mar. 28, 2006

(54) WIRELESS COMMUNICATIONS SYSTEMS, RADIO FREQUENCY IDENTIFICATION DEVICES, WIRELESS COMMUNICATIONS METHODS, AND RADIO FREQUENCY IDENTIFICATION DEVICE COMMUNICATIONS METHODS

(75) Inventors: Richard M. Pratt, Richland, WA (US); Steven B. Thompson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 420 days.

(21) Appl. No.: 10/263,656

(22) Filed: Oct. 2, 2002

(65) Prior Publication Data

US 2004/0066280 A1    Apr. 8, 2004

(51) Int. Cl.
*H04Q 5/22* (2006.01)
*H04Q 9/00* (2006.01)
*G08B 5/22* (2006.01)
*G08B 29/00* (2006.01)
*G08B 13/14* (2006.01)

(52) U.S. Cl. ............... 340/10.2; 340/10.1; 340/10.51; 340/825.36; 340/825.49; 340/5.92; 340/512.1; 340/568.1

(58) Field of Classification Search ............... 340/10.2, 340/7.8, 10.51, 10.1, 825.49, 825.36, 5.92, 340/568.1, 512.1, 825.54; 235/375
See application file for complete search history.

(56) References Cited

U.S. PATENT DOCUMENTS

| | | | |
|---|---|---|---|
| 4,075,632 A | 2/1978 | Baldwin et al. | ............. 343/6.8 |
| 4,352,183 A | 9/1982 | Davis et al. | .................. 371/33 |
| 4,360,810 A | 11/1982 | Landt | ......................... 343/6.5 |
| 4,914,649 A * | 4/1990 | Schwendeman et al. | .... 370/311 |
| 4,928,000 A | 5/1990 | Eglise et al. | |
| 5,124,699 A * | 6/1992 | Tervoert et al. | ........... 340/10.2 |
| 5,349,355 A | 9/1994 | Longas et al. | |
| 5,519,381 A | 5/1996 | Marsh et al. | |
| 5,521,601 A | 5/1996 | Kandlur et al. | ............... 342/44 |
| 5,530,702 A | 6/1996 | Palmer et al. | ............. 370/85.3 |
| 5,550,547 A | 8/1996 | Chan et al. | ................... 342/42 |
| 5,726,630 A | 3/1998 | Van Zyl et al. | |
| 5,757,923 A | 5/1998 | Koopman, Jr. | ............... 380/46 |

(Continued)

FOREIGN PATENT DOCUMENTS

EP    0 266 125 A    5/1988

OTHER PUBLICATIONS

U.S. Patent Appn. filed Oct. 2, 2002, entitled "RFID System and Method Including Tag ID Compression", Michael A. Hughes and Richard M. Pratt.

(Continued)

*Primary Examiner*—Michael Horabik
*Assistant Examiner*—Scott Au
(74) *Attorney, Agent, or Firm*—Wells St. John, P.S.

(57) ABSTRACT

Wireless communications systems, radio frequency identification devices, wireless communications methods, and radio frequency identification device communications methods are described. In one aspect, a wireless communications system includes a reader configured to output a plurality of wireless signals including different modulation frequencies and to receive a plurality of second wireless signals, a plurality of communication devices configured to receive the first wireless signals and to output the second wireless signals using backscatter modulation and wherein the communication devices are individually configured to respond to one of the first wireless signals having a first modulation frequency at a first moment in time and to respond to one of the first wireless signals having a second modulation frequency different than the first modulation frequency at a second moment in time.

40 Claims, 3 Drawing Sheets

U.S. PATENT DOCUMENTS

| | | | |
|---|---|---|---|
| 5,777,561 | A | 7/1998 | Chieu et al. ............ 340/825.54 |
| 5,850,187 | A | 12/1998 | Carrender et al. ......... 340/10.6 |
| 5,883,582 | A | 3/1999 | Bowers et al. ......... 340/825.54 |
| 5,940,006 | A * | 8/1999 | MacLellan et al. ........ 340/10.1 |
| 5,986,570 | A | 11/1999 | Black et al. ........... 340/825.54 |
| 5,995,019 | A | 11/1999 | Chieu et al. ........... 340/825.54 |
| 6,091,319 | A | 7/2000 | Black et al. ............... 340/10.2 |
| 6,104,291 | A | 8/2000 | Beauvillier et al. ...... 340/572.1 |
| 6,107,921 | A | 8/2000 | Eberhardt et al. |
| 6,114,971 | A * | 9/2000 | Nysen ....................... 340/10.3 |
| 6,130,623 | A | 10/2000 | MacLellan et al. .... 340/825.54 |
| 6,157,300 | A | 12/2000 | Quaderer et al. |
| 6,177,861 | B1 | 1/2001 | MacLellan et al. ........ 340/10.1 |
| 6,265,962 | B1 | 7/2001 | Black et al. ............... 340/10.2 |
| 6,275,681 | B1 | 8/2001 | Vega et al. |
| 6,282,407 | B1 | 8/2001 | Vega et al. |
| 6,294,997 | B1 * | 9/2001 | Paratore et al. .......... 340/572.1 |
| 6,307,848 | B1 | 10/2001 | Wood, Jr. ................... 370/329 |
| 6,362,738 | B1 | 3/2002 | Vega |
| 6,366,260 | B1 | 4/2002 | Carrender .................... 343/866 |
| 6,414,626 | B1 * | 7/2002 | Greef et al. ................. 342/127 |
| 6,499,656 | B1 * | 12/2002 | Marsh et al. ................ 235/375 |
| 6,580,369 | B1 | 6/2003 | Eberhardt et al. |
| 6,611,199 | B1 | 8/2003 | Geiszler et al. |
| 2002/0093426 | A1 | 7/2002 | Jackson et al. |

OTHER PUBLICATIONS

U.S. Patent Appn. filed Oct. 2, 2002, entitled "Wireless Communication Systems, Radio Frequency Identification Devices, Methods of Enhancing a Communications Range of a Radio Frequency Identification Device, and Wireless Communication Methods", by Richard M. Pratt and Steven B. Thompson.

U.S. Patent Appn. filed Oct. 2, 2002, entitled "Wireless Communications Devices, Methods of Processing a Wireless Communication Signal, Wireless Communication Synchronization Methods and a Radio Frequency Identification Device Communication Method", by Richard M. Pratt and Steven B. Thompson.

U.S. Patent Appn. filed Oct. 2, 2002, entitled "Radio Frequency Identification Devices, Backscatter Communication Device Wake-Up Methods, Communication Device Wake-Up Methods and a Radio Frequency Identification Device Wake-Up Methods", by Richard M. Pratt and Michael A. Hughes.

U.S. Patent Appn. filed Oct. 2, 2002, entitled "A Challenge-Based Tag Authentication Model", by Michael A. Hughes and Richard M. Pratt.

U.S. Patent Appn. filed Oct. 2, 2002, entitled "Method of Simultaneously Reading Multiple Radio Frequency Tags, RF Tag, and RF Reader", by Emre Ertin, Richard M. Pratt, Michael A. Hughes, Kevin L. Priddy and Wayne M. Lechelt.

U.S. Patent Appn. filed Oct. 2, 2002, entitled "Radio Frequency Identification Device Communications Systems, Wireless Communication Devices, Wireless Communication Systems, Backscatter Communication Methods, Radio Frequency Identification Device Communication Methods and a Radio Frequency Identification Device", by Michael A. Hughes and Richard M. Pratt.

U.S. Patent Appn. filed Oct. 2, 2002, entitled "System and Method to Identify Mulitple RFID Tags", by Michael A. Hughes and Richard M. Pratt.

PCT Application No. PCT/US03/30210; filed Sep. 23, 2003; Annex to Invitation to Pay Additional Fees issued Mar. 3, 2004; 2 pps.

U.S. Appl. No. 09/589,001, filed Jun. 6, 2000, R. W. Gilbert et al.

U.S. Appl. No. 09/802,408, filed Mar. 9, 2001, R. W. Gilbert et al.

U.S. Appl. No. 09/833,465, filed Apr. 11, 2001, C. L. Carrender et al.

U.S. Appl. No. 09/588,997, filed Jun. 6, 2000, R. W. Gilbert et al.

U.S. Appl. No. 09/589,000, filed Jun. 6, 2000, R. W. Gilbert et al.

U.S. Appl. No. 09/588,998, filed Jun. 6, 2000, C. L. Carrender et al.

U.S. Appl. No. 09/797,539, filed Feb. 28, 2001, C. L. Carrender.

U.S. Appl. No. 09/833,391, filed Apr. 11, 2001, C. L. Carrender.

Finkenzeller, Klaus, "Radio-Frequency identification Fundamentals and Applications", *RFID Handbbook*, Chapter 8, pp. 151-158 (Jan. 2002).

International Standard, ISO/IEC, "Part 2: Mechanisms Using Symmetry Encipherment Algorithms", *Information Technology—Security Techniques—Entity Authentication*, #ISO/IEC 9798-2:1999(E), 2nd Ed., pp 1-11 (Jul. 15, 1999).

Agilent Technologies, "Schottky Diode Voltage Doubler, Application Note 956-4", 2 pages (1999).

* cited by examiner

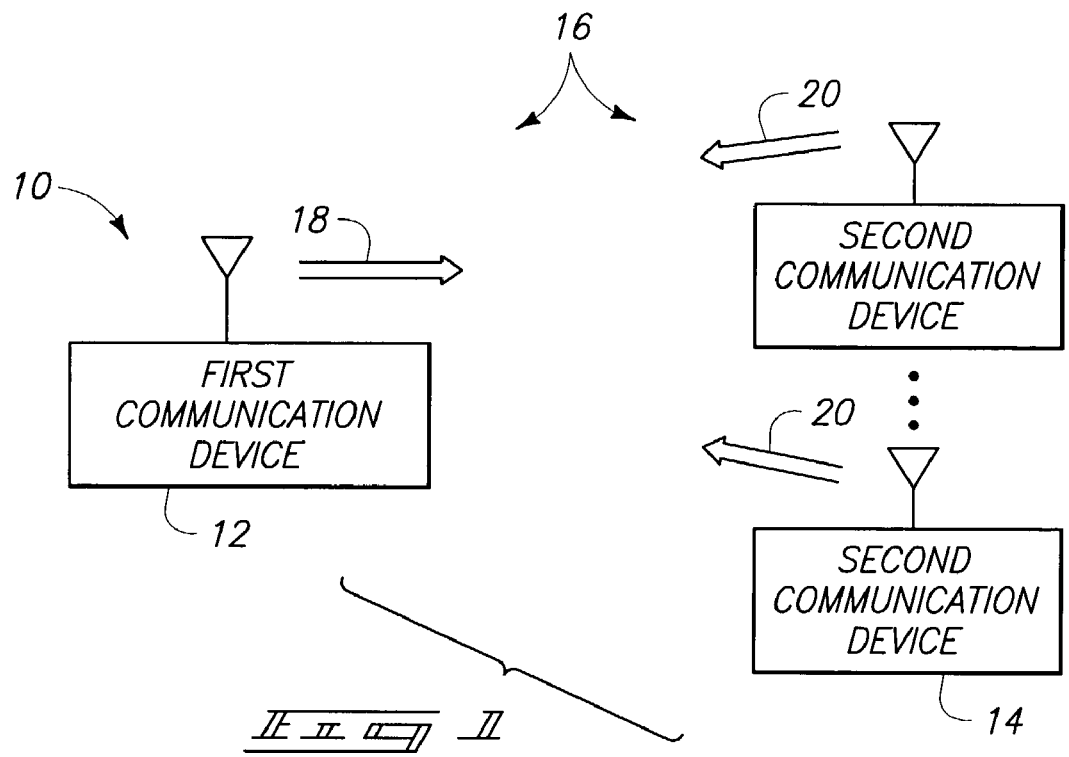
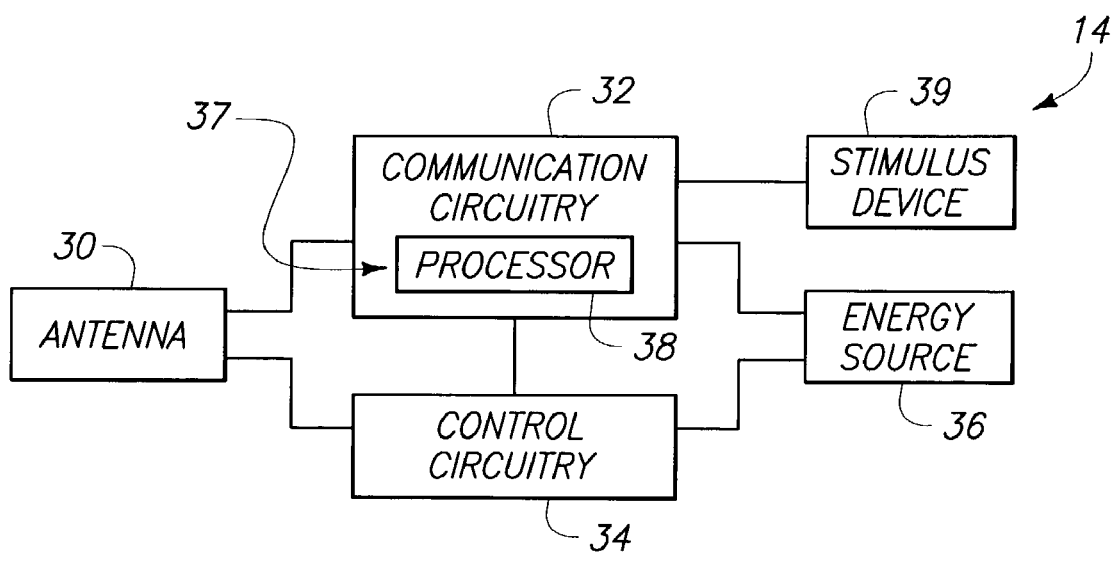

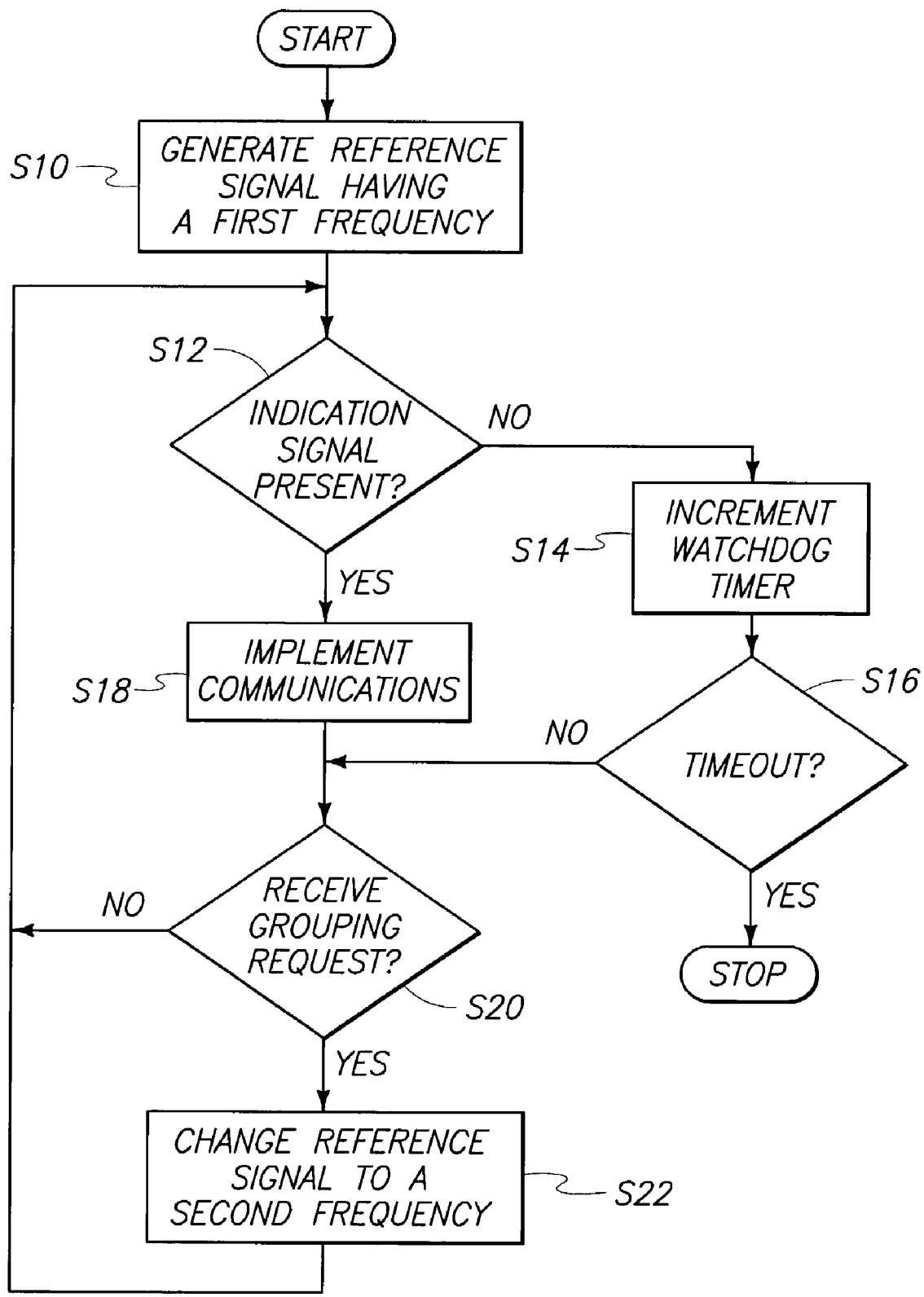

WIRELESS COMMUNICATIONS SYSTEMS, RADIO FREQUENCY IDENTIFICATION DEVICES, WIRELESS COMMUNICATIONS METHODS, AND RADIO FREQUENCY IDENTIFICATION DEVICE COMMUNICATIONS METHODS

TECHNICAL FIELD

This invention relates to wireless communications systems, radio frequency identification devices, wireless communications methods, and radio frequency identification device communications methods.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems have been developed to facilitate identification operations. For example, one device may be arranged to output and receive radio frequency communications and one or more remotely located device may be configured to communicate with the one device using radio frequency communications. The remotely located device(s) may be referred to as a tag, while the other device may be referred to as a reader. Some advantages of radio frequency communications of exemplary radio frequency identification device systems include an ability to communicate without contact or line-of-sight, at relatively fast speeds, and with robust communication channels.

Some remote device configurations are arranged to utilize electrical energy from a source resident upon the device itself including, for example, a battery. Some of these remote device configurations may operate in a plurality of different operational modes wherein different amounts of electrical energy are utilized by the device. Wake-up circuits may control a state of operation of the device to assist with conservation of electrical energy. For example, the device may be provided in a low-power mode in the absence of communications and a higher-power mode during processing of incoming signals. Accordingly, electrical energy is consumed at an increased rate during processing of the signals.

Some of the aspects of the present invention described below provide exemplary methods and apparatuses arranged to reduce the consumption of electrical energy of a wireless communication device.

BRIEF DESCRIPTION OF THE DRAWINGS

Preferred embodiments of the invention are described below with reference to the following accompanying drawings.

FIG. 1 is an illustrative representation of an exemplary wireless communication system.

FIG. 3 is a schematic representation of components depicted in FIG. 2.

FIG. 4 is a flow chart of an exemplary methodology executable within a communication device of the system.

DETAILED DESCRIPTION OF THE PREFERRED EMBODIMENTS

Figure 2:
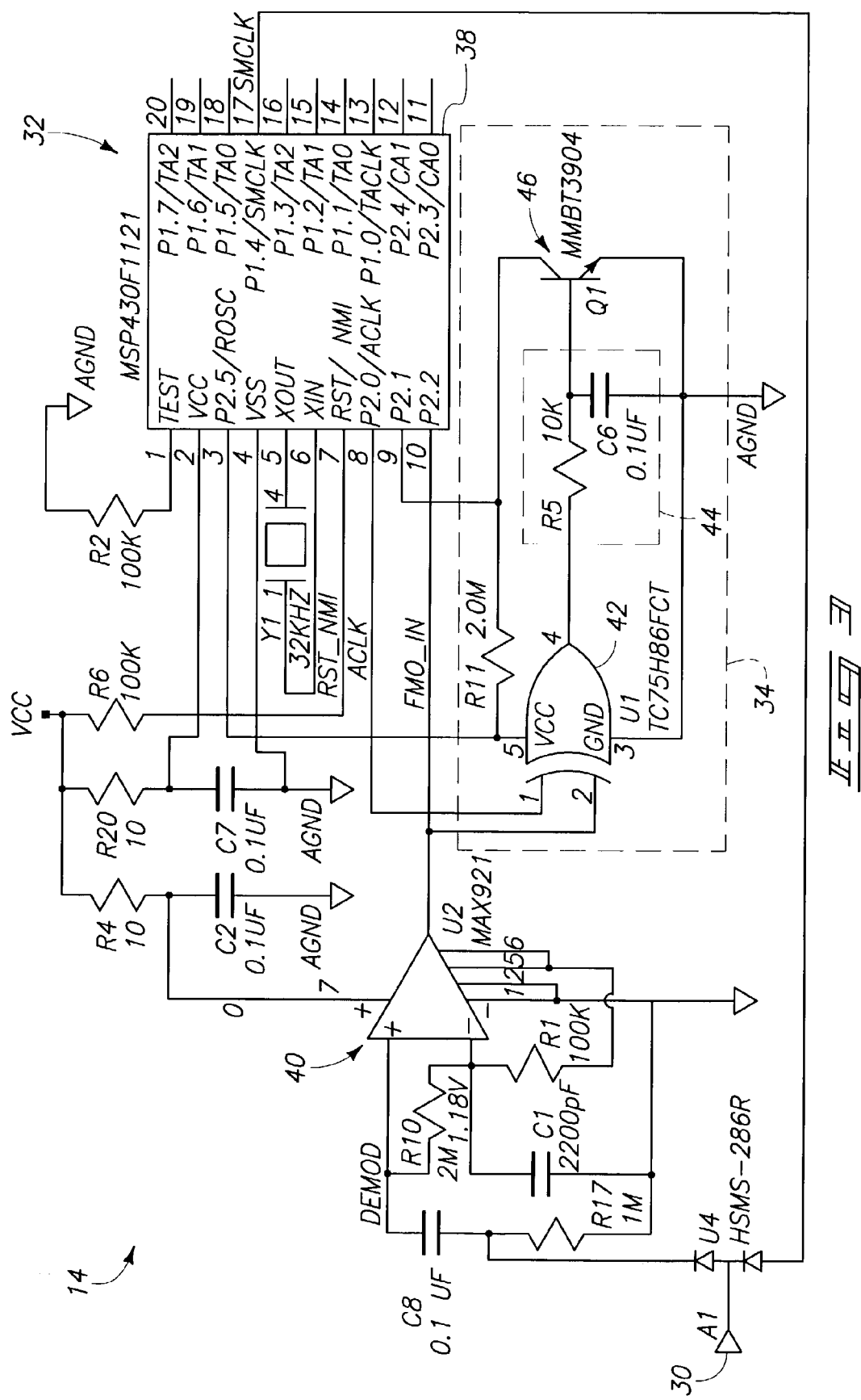
FIG. 2 is a functional block diagram of components of an exemplary wireless communication device of the system.

Attention is directed to the following commonly assigned applications, which are incorporated herein by reference:

U.S. patent application Ser. No. 10/263,826 entitled "Radio Frequency Identification Device Communications Systems, Wireless Communication Devices, Backscatter Communication Methods, Radio Frequency Identification Device Communication Methods and A Radio Frequency Identification Device," by inventors Mike A. Hughes and Richard M. Pratt; U.S. patent application Ser. No. 10/263,809, entitled "Method of Simultaneously Reading Multiple Radio Frequency Tags, RF Tag, and RF Reader," by inventors Emre Ertin, Richard M. Pratt, Mike A. Hughes, Kevin L. Priddy, and Wayne M. Lechelt; U.S. patent application Ser. No. 10/263,873, entitled "RFID System and Method Including Tag ID Compression," by inventors Richard M. Pratt and Mike A. Hughes; U.S. patent application Ser. No. 10/264,078, entitled "System and Method to Identify Multiple RF Tags," by inventors Mike A. Hughes and Richard M. Pratt; U.S. patent application Ser. No. 10/263,940, entitled "Radio Frequency Identification Devices, Backscatter Communication Device Wake-Up Methods, Communication Device Wake-Up Methods And A Radio Frequency Identification Device Wake-Up Method," by inventors Richard Pratt and Mike Hughes; U.S. patent application Ser. No. 10/263,997, entitled "Wireless Communication Systems, Radio Frequency Identification Devices, Methods Of Enhancing A Communications Range Of A Radio Frequency Identification Device, And Wireless Communication Methods," by inventors Richard Pratt and Steven B. Thompson; U.S. patent application Ser. No. 10/263,670, entitled "Wireless Communications Devices, Methods of Processing a Wireless Communication Signal, Wireless Communication Synchronization Methods and a Radio Frequency Identification Device Communication Method," by inventors Richard M. Pratt and Steven B. Thompson; U.S. patent application Ser. No. 10/263,635, entitled "A Challenged-Based Tag Authentication Model," by inventors Mike A. Hughes and Richard M. Pratt; U.S. patent application Ser. No. 09/589,001, filed Jun. 6, 2000, entitled "Remote Communication System and Method," by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System," by inventors R. W. Gilbert, G. A. Anderson, and K. D. Steele; U.S. patent application Ser. No. 09/833,465, filed Apr. 11, 2001, entitled "System and Method for Controlling Remote Device," by inventors C. L. Carrender, R. W. Gilbert, J. W. Scott, and D. Clark; U.S. patent application Ser. No. 09/588,997, filed Jun. 6, 2000, entitled "Phase Modulation in RF Tag," by inventors R. W. Gilbert and C. L. Carrender; U.S. patent application Ser. No. 09/589,000, filed Jun. 6, 2000, entitled "Multi-Frequency Communication System and Method," by inventors R. W. Gilbert and C. L. Carrender; U.S. patent application Ser. No. 09/588,998; filed Jun. 6, 2000, entitled "Distance/Ranging by Determination of RF Phase Delta," by inventor C. L. Carrender; U.S. patent application Ser. No. 09/797,539, filed Feb. 28, 2001, entitled "Antenna Matching Circuit," by inventor C. L. Carrender; U.S. patent application Ser. No. 09/833,391, filed Apr. 11, 2001, entitled "Frequency Hopping RFID Reader," by inventor C. L. Carrender.

According to one aspect of the invention, a wireless communications system comprises a reader configured to output a plurality of wireless signals including different modulation frequencies and to receive a plurality of second wireless signals, a plurality of communication devices configured to receive the first wireless signals and to output the second wireless signals using backscatter modulation and wherein the communication devices are individually configured to respond to one of the first wireless signals having a first modulation frequency at a first moment in time and to respond to one of the first wireless signals having a second modulation frequency different than the first modulation frequency at a second moment in time.

According to another aspect of the invention, a radio frequency identification device comprises an antenna configured to communicate wireless signals, radio frequency identification device communication circuitry coupled with the antenna and configured to process a plurality of different first wireless signals received from a reader and to control the outputting of a plurality of second wireless signals to implement radio frequency identification device communications with the reader and wherein the radio frequency identification device communication circuitry is configured to generate a reference signal having a first frequency to control reception of a first type of the first wireless signals and to generate the reference signal having a second frequency different than the first frequency to control reception of a second type of the first wireless signals.

According to another aspect of the invention, a wireless communications method comprises providing a reader and a plurality of communication devices, communicating a plurality of different first, wireless signals using the reader, first configuring a plurality of communication devices to respond to a first type of the first wireless signals, second configuring at least one of the communication devices to respond to a second type of the first wireless signals and backscatter modulating radio frequency energy using the communication devices to communicate a plurality of second wireless signals to respond to the first type of the first wireless signals and the second type of the first wireless signals.

According to yet another aspect of the invention, a radio frequency identification device communications method comprises providing a radio frequency identification device comprising communication circuitry, receiving a plurality of wireless communications signals within the radio frequency identification device, providing a clock signal including a frequency using the radio frequency identification device and processing the received wireless communications signals using the communication circuitry, the processed wireless communications signals having a modulation frequency corresponding to the frequency of the clock signal.

According to still yet another aspect of the invention, a radio frequency identification device communications method comprises providing a reader and a radio frequency identification device, communicating a plurality of forward link wireless signals using the reader including first wireless signals having a first modulation frequency and second wireless signals having a second modulation frequency, receiving the forward link wireless signals using the radio frequency identification device, generating a clock signal using the radio frequency identification device and the clock signal having a frequency substantially equal to the first modulation frequency, processing a predefined one of the first wireless signals using the radio frequency identification device, changing the frequency of the clock signal to a frequency substantially equal to the second modulation frequency using the radio frequency identification device responsive to the processing, disregarding others of the received first wireless signals using the radio frequency identification device after the changing, processing the received second wireless signals after the changing and outputting a plurality of backscatter modulation signals comprising return link wireless signals using the radio frequency identification device for communication to the reader to implement radio frequency identification device communications.

Referring to FIG. 1, an exemplary wireless communication system 10 is depicted. The exemplary system 10 includes a first communication device 12 and a plurality of second communication devices 14. First and second communication devices 12, 14 are arranged to implement wireless communications 16 in the depicted exemplary embodiment. Possible wireless communications 16 include first wireless signals 18 communicated from first communication device 12 and second communication signals 20 communicated from respective second communication devices 14.

System 10 is provided to illustrate exemplary structural and method aspects of the present invention. In one possible implementation, system 10 is implemented as a radio frequency identification device (RFID) communications system. For example, in such an arrangement, first communication device 12 may be implemented as a reader, and second communication devices 14 may be implemented as transponders, such as RFID tags. In one configuration, wireless signals 18 may be referred to as forward link wireless signals and wireless signals 20 may be referred to as return link wireless signals communicated responsive to forward link wireless signals 18. Exemplary wireless communications 16 include electromagnetic signals, such as radio frequency signals. Alternatively, wireless communications 16 may comprise infrared signals, acoustic signals, or any other appropriate signals capable of being communicated between devices 12, 14.

Referring to FIG. 2, an exemplary arrangement of one of second communication devices 14 is shown. The exemplary configuration of device 14 includes an antenna 30, communication circuitry 32, control circuitry 34, energy source 36, and a stimulus device 39.

Energy source 36 may comprise one of a plurality of possible configurations corresponding to the implementation of communication device 14. Communication device 14 may be implemented in passive, semi-passive or active configurations in exemplary arrangements.

In semi-passive implementations, energy source 36 may comprise a battery utilized to provide electrical energy to communication circuitry 32 to implement processing of wireless signals 18 while electromagnetic energy received within device 14 is utilized to generate wireless signals 20.

For active implementations, energy source 36 may also comprise a battery to provide operational electrical energy to communication circuitry 32 similar to the semi-passive implementation. In addition, energy source 36 may also be utilized to generate radio frequency energy for communication of signals 20.

For passive implementations of device 14, received electromagnetic energy is utilized to provide operational electrical energy to components of device 14 as well as provide radio frequency energy for communicating wireless signals 20. In such an implementation, energy source 36 may comprise a power antenna and discrete components arranged to convert received electromagnetic energy into usable operational electrical energy.

It may be desired to conserve electrical energy of a battery (if utilized) in order to extend the useful, operational life of the battery. In one embodiment, communication circuitry 32 is arranged to operate in a plurality of operational modes, including at least first, second and third different operational modes in one embodiment. Individual ones of the operational modes have different power requirements and consume electrical energy at different rates. Exemplary operational modes are described in a U.S. patent application Ser. No. 10/263,940 entitled "Radio Frequency Identification Devices, Backscatter Communication Device Wake-up Methods, Communication Device Wake-up Methods and A Radio Frequency Identification Device Wake-up Method," naming Richard Pratt and Mike Hughes as inventors, filed the same day as the present application, and incorporated herein by reference.

Control circuitry 34 may be implemented to control the operations of device 14 in the different operational modes. Operations of exemplary control circuitry 34 are described in the above-incorporated patent application.

Antenna 30 is arranged to receive electromagnetic energy including signals 18 and output electromagnetic energy including signals 20. Antenna 30 may comprise a single antenna for communication of signals 18, 20 or include a plurality of respective dedicated antennas for communication of signals 18, 20. An additional antenna (not shown) may be provided in passive applications to provide operational energy.

Communication circuitry 32 includes processing circuitry 37 according to at least one configuration. Processing circuitry 37 is arranged to control operations of device 14 including processing received signals and formulating outputted signals. Exemplary processing circuitry 37 includes a processor 38 shown in FIG. 3 and implemented as a model number MSP430F1121 available from Texas Instruments, Inc. Other processing circuitry and processor configurations are possible.

Processor 38 of communication circuitry 32 is configured to execute instructions to control communication operations of device 14. For example, processor 38 of communication circuitry 32 is arranged to process received wireless signals 18 and to control communication of outputted wireless signals 20. In one arrangement, processor 38 is configured to control antenna 30 to generate wireless signals 20 using backscatter modulation communication techniques. Communication circuitry 32 may control outputting of wireless signals 20 using backscatter modulation according to at least one radio frequency identification device communication protocol.

For example, communication circuitry 32 controls electrical characteristics of antenna 30 according to one backscatter embodiment. Processor 38 may provide a modulation signal to alter electrical characteristics of antenna 30 wherein electromagnetic energy is selectively reflected by antenna 30. Antenna 30 reflects electromagnetic energy creating wireless signals 20 responsive to the modulated signal according to one exemplary backscatter implementation.

The modulated signal may be encoded with information to be communicated from device 14 to device 12. Exemplary information includes identification information, such as a unique serial number which identifies the communicating device 14, or any other desired information to be communicated. According to one exemplary arrangement, communication devices 12, 14 are configured to communicate wireless signals 18, 20 using on/off key (OOK) modulation, such as a FM0 or FM1 encoding scheme. Other types of modulation or schemes may be utilized to communicate information between devices 12, 14.

Communication circuitry 32 arranged to implement RFID communications may be referred to as radio frequency identification device communication circuitry. Communication circuitry 32 may be operable to control communication of wireless signals 20 responsive to processing of one or more wireless signal 18. For example, circuitry 32 may implement transponder communications in one exemplary embodiment.

Processing of received signals 18 may include extracting an identifier from the wireless signals 18 (e.g., an identifier of the communicating device 12 and\or identifying device 14) and also include processing of commands within signals 18. Responsive to processing, device 14 may selectively output or communicate wireless signals 20 including identification information or other desired requested information from first communication device 12.

Stimulus device 39 is arranged to generate signals responsive to conditions surrounding the device 14. For example, device 39 may sense or monitor one or more environmental condition and provide information regarding the environmental condition (e.g., temperature information, pressure information, altitude information, etc.) about device 14. In one configuration, device 39 is configured to trigger or generate a signal responsive to a predefined threshold being detected. Device 39 is configured to monitor one or more other condition in other embodiments.

As mentioned above, control circuitry 34 may be utilized to control the operations of device 14 in a plurality of different operational modes to conserve electrical energy of energy source 36. According to aspects of the invention, devices 14 may be provided in a plurality of groups to further conserve electrical energy of the respective devices 14 or for other reasons (e.g., if communications with one of the groups is desired at a given moment in time).

Configurations of system 10 described herein permit device 12 to tailor communications to respective groups. In one exemplary configuration, device 12 is arranged to output wireless signals 18 having different modulation frequencies of a carrier signal (exemplary carrier signals are 900 MHz and 2.4 GHz). Initially, device 12 may output one of signals 18 comprising a universal wake-up signal. Such a signal may comprise a 4 kHz modulated signal, for example. Devices 14 tuned to monitor for the reception of the 4 kHz modulated signal wake-up and enter different operational modes wherein signals 18 may be processed and signals 20 may be communicated. According to aspects of the invention, and following wake-up, devices 14 may be provided into one or more different group to conserve electrical energy of the devices 14, to facilitate communications with desired ones of the devices 14, or for other reasons.

According to one embodiment, devices 14 are individually configured to respond to selected wireless signals 18 of one modulation frequency (e.g., 4 kHz) at a first moment in time. Thereafter, devices 14 may be individually configured to process and respond to wireless signals 18 having another modulation frequency (e.g., 8 kHz, 16 kHz, 32 kHz, for example) at another moment-in time. Following the configuring to process and respond to wireless signals 18 having another modulation frequency, the devices 14 will not process or respond to wireless signals 18 having the one or other undesired modulation unless such devices 14 are again configured to process and respond to the signals 18 having the one or other modulation (e.g., responsive to watchdog timer operations described below).

Signals 18 herein of different modulation frequencies may be referred to as different types of signals 18. Accordingly, individual devices 14 may be configured to process and respond to a first type of signals 18 at a first moment in time and a second type of signals 18 at another moment in time. In addition, one group of devices 14 may respond to a first type of signals 18 and another group of devices 14 may respond to a second type of signals 18.

For example, a plurality of groups of devices 14 may be provided corresponding to the wireless signals 18 that the devices are configured to process and respond to. In but one example, one group of devices 14 may be arranged to process and respond to signals 18 having a modulation frequency of 8 kHz and another group of devices 14 may be arranged to process and respond to signals 18 having a modulation frequency of 16 kHz. Devices 14 in one group are not configured to process or respond to signals 18 of other modulation frequencies in at least one aspect of the invention. Accordingly, communications with a desired group of devices 14 may be facilitated by device 12 using the corresponding modulation frequency and undesired devices 14 or groups of devices 14 will not process or respond to such communications. Accordingly, devices 14 of the undesired groups will conserve electrical energy which would have, been otherwise utilized to fully process the signals only to determine such signals were not intended for the respective device. As mentioned above, it is also possible for a device 14 to be provided within a plurality of different groups at a different moments in time.

A plurality of different methods may be utilized to provide devices 14 into respective groups. In one exemplary method, device 12 is arranged to output a predefined command within one of the signals 18 to control the grouping of devices 14 and the signals to which such devices 14 will respond. For example, during wake-up operations, device 12 may provide the command within a signal 18 having the wake-up frequency (e.g., 4 kHz). The command may dictate which group the device 14 is to be associated with.

Alternatively, device 12 may issue the predefined command to a device 14 responsive to a communication signal 20 from the device 14. In one arrangement, device 12 initially issues an "Identify" command. Devices 14 may respond and be discovered by device 12. Thereafter, device 12 may issue the predefined command to at least some of the discovered devices 14 to provide the devices 14 into one or more group. Processor 38 is arranged in one embodiment to change or place the device 14 into a respective group responsive to the command.

Another exemplary method utilizes the output of stimulus device 39 to control grouping of the respective associated device 14. If device 39 detects a predefined threshold or condition being present, device 39 may generate and apply an appropriate signal to processor 38 to control the grouping. Processor 38 thereafter provides device 14 into the appropriate group.

Following the changing of the grouping of a respective device, processor 38 or other circuitry may be arranged to enable an internal watchdog timer of processor 38. The processor 38 may return grouping of the device 14 to another group (e.g., previous group, original group, etc.) responsive, to the watchdog timer indicating the expiration of a predefined period of time, the expiration of the predefined period of time since the last communication after the grouping of the device 14 was changed, or other criteria.

In one embodiment, devices 14 are configured to control the types of wireless signals 18 to which they will process and\or respond to provide the grouping operations. In one exemplary configuration, devices 14 are individually arranged to generate a reference signal which controls the types of signals 18 which will be processed and\or responded to. The devices 14 generate the reference signal comprising a clock signal in at least one configuration.

Devices 14 in the described exemplary configuration generate the reference signals having a plurality of different frequencies to control the reception of a plurality of different first wireless signals 18 having different frequencies of modulation. In one arrangement, devices 14 individually generate the frequency of the reference signal to correspond to a frequency of modulation of the wireless signals 18 desired to be received and processed. Devices 14 may compare received wireless signals 18 with the reference signal. Signals 18 individually having a modulation frequency which corresponds to the frequency of the reference signal are received and processed by the devices 14, and signals, 18 not having the modulation frequency which corresponds to the frequency of the reference signal are disregarded and are not processed. In one arrangement, the modulation frequency of the signals 18 which corresponds to the frequency of the reference signal is substantially equal to the frequency of the reference signal.

For example, devices 14 may generate the reference signal having a first frequency during a first moment in time to permit the reception and processing of wireless signals 18 having a first modulation frequency. Thereafter, devices 14 may generate the reference signal having a second frequency different than the first frequency during a second moment in time to permit the reception and processing of wireless signals 18 having a second modulation frequency.

As mentioned above, predefined wireless signals 18 may include a command to control the wireless signals 18 which are processed by devices 14. Alternatively, stimulus device 39 may issue appropriate signals. In the described exemplary arrangement, respective devices 14 are configured to change the frequency of the reference signal responsive to the reception of the predefined wireless signals, the reception of signals from stimulus device 39, or other desired criteria. In addition, the utilization of reference signals to provide grouping is exemplary and other structures or methods may be utilized to provide grouping of devices 14.

Upon initial wake-up, processor 38 generates the reference signal having a predefined frequency (e.g., 4 kHz). Device 12 is arranged to communicate initial signals during wake-up using a corresponding frequency of modulation (e.g., 4 kHz). Such signals correspond to the reference signal and accordingly are processed by communication circuitry 32 and processor 38. At moments of time, it may be desired to group the device 14 as described above. Responsive to an appropriate event (e.g., predefined command from device 12, output from stimulus device 39, etc.) processor 38 changes the frequency of the reference signal to another frequency corresponding to a respective group.

As illustrated in the exemplary configuration shown in FIG. 3, a 32 kHz crystal may be coupled with pins 5 and 6 of processor 38. Processor 38 may utilize an internal clock divisor to select and provide reference signals of different frequencies. For example, processor 38 may divide by 8 to provide the 4 kHz wake-up reference signal and thereafter divide by 1, 2, 4, or other value to provide reference signals of different frequencies corresponding to different groups.

The reference signals having different frequencies correspond to a plurality of respective desired groups, for example. A first frequency (4 kHz) frequency may be utilized as a universal wake-up frequency. Another frequency value (e.g., 8 kHz) may be assigned to implement communications with already identified devices 14. More specifically, after wake-up and identification of a device 14 using the first frequency, the identified device 14 may be set to respond to a second frequency. Thereafter, such device 14 no longer wakes-up and listens to initial device 14 identification requests using the first frequency. In an exemplary application with a large number of devices 14, the power savings from not having to wake-up and decode irrelevant messages may be significant. Further, additional frequencies may be used to further segregate identified devices 14 for additional communications.

Aspects of the invention may also be extended to a variable frequency assignment. For example, using a higher low-power mode (e.g., approximately 10 microAmps) of processor 38 and utilizing a 16 bit timer of processor 38, additional reference signals having additional frequencies may be created by dividing a crystal frequency of processor 38 by a preset timer value. For a 32 kHz crystal frequency, and a divisor selected to create clock frequencies on a minimum of 200 Hz intervals, over twenty discrete frequencies could be selected and utilized to directly address twenty different groups of devices 14.

In addition, another variable frequency assignment may be utilized. Using another higher low-power mode of processor 38 (e.g., approximately 100 microAmps) and using a 16-bit timer of processor 38, additional clock signal frequencies can be generated by dividing a system frequency of processor 38 by a preset timer value. For a 4 MHz crystal frequency, and the clock divisor selected to create a clock frequency on a minimum of 200 Hz intervals, over 128 discrete frequencies could be utilized to directly address 128 different groups of devices 14. In some embodiments, the discrete frequencies could be different addresses of respective devices 14.

The watchdog timer of processor 38 may also be enabled responsive to an appropriate stimulus, such as the reception of an indication signal from control circuitry 34 or reception of signals from stimulus device 39. The processor 38 returns operations to a lower power state if communications are not received within processor 38 via pin 10 and\or communications cease for a specified period of time as determined by the watchdog timer.

Exemplary control circuitry 34 described herein comprises components which may be readily implemented in an Application Specific Integrated Circuit (ASIC) configuration which utilizes a relatively minimal amount of real estate of device 14. In addition, processor 38 may selectively supply operational electrical energy to circuitry 34 via pin 3 to reduce consumption of power during periods of inactivity. Power is further conserved by rejection of radio frequency energy from other sources than device 12, and rejection of radio frequency energy intended for devices 14 in other groups.

Referring to FIG. 3, exemplary circuitry of communication device 14 is shown. The depicted circuitry of FIG. 3 illustrates exemplary configurations of antenna 30, communication circuitry 32, processor 38 and control circuitry 34. Energy source 36 (not shown in FIG. 3) may be coupled with the illustrated VCC terminals and AGND terminals. The depicted exemplary circuitry of FIG. 3 is provided to illustrate possible methodologies and structures which may be utilized to implement aspects of the present invention. Other alternative arrangements and methods are possible.

Radio frequency energy is received via antenna 30. The diodes coupled with antenna 30 operated to rectify electrical energy corresponding to the received radio frequency energy. The electrical energy applied to a comparator 40 corresponds to the modulation of the signals 18 provided by the first device 12. Comparator 40 operates in conjunction with control circuitry 34 to reject spurious signals and perform wake-up functionality described in the U.S. patent application Ser. No. 10/263,940 incorporated by reference above.

For example, during initial modes of operation and upon detection of appropriate initial radio frequency energy during wake-up, processor 38 begins to generate an appropriate reference signal (e.g., ACLK) of a predefined frequency (e.g., 4 kHz) via pin 8. Device 12 may generate wake-up commands using 4 kHz modulation. Accordingly, the ACLK signal and the output of comparator 40 (corresponding to the received modulated wireless signal 18) are applied to control circuitry 34.

In one configuration, control circuitry 34 is configured to compare a frequency of received radio frequency energy (corresponding to wireless signals 18) as indicated by the signal outputted from comparator 40 with a frequency of the reference signal. Responsive to the comparison, control circuitry 34 selectively asserts an indication signal applied to pin 9 of processor 38. In one embodiment, asserting of the indication signal indicates reception of radio frequency energy via antenna 30 having a modulation frequency corresponding to a frequency of the reference signal and indicating appropriate signals for processing and/or response.

Accordingly, in the illustrated exemplary configuration, control circuitry 34 implements comparison operations. Control circuitry 34 includes an XOR logic device 42, a filter 44, and a transistor 46. In the depicted embodiment, XOR logic device 42 is coupled with comparator 40 and is configured to receive the outputted signal therefrom representative of radio frequency energy received via antenna 30. XOR logic device 42 is also coupled with processor 38 and is configured to receive the reference signal.

Filter 44 is coupled intermediate XOR logic device 42 and transistor 46 and is implemented as a low pass filter in the exemplary configuration. Filter 44 is arranged to smooth the output of XOR logic device 42 and selectively trigger transistor 46 responsive to radio frequency energy received via antenna 30 and corresponding outputted signals from comparator 40 and the reference signals. The output of filter 44 is the frequency difference of the two source signals inputted to device 42 (i.e., beat frequency). If the frequency difference is above a cut-off frequency of filter 44, the output signal has a voltage equal to approximately the mid-point voltage between the supply and ground in the described exemplary configuration and is higher than a trigger voltage of transistor 46. However, the output begins to oscillate at the beat frequency between the ground and supply values if the frequency difference is below the cut-off frequency. The exemplary circuitry 34 utilizes the filtered signal approaching ground to trigger transistor 46 and assert the indication signal via transistor 46. Transistor 46 is ON until the filtered output signal is within 600 mV of ground. When the filtered output signal is below 600 mV, transistor 46 is turned OFF (i.e., triggered) causing assertion of the indication signal which is monitored by processor 38 via pin 9.

As described above in accordance with an exemplary implementation, control circuitry 34 is arranged to compare a frequency of received electrical energy (FMO_IN) with respect to a frequency of the reference signal to analyze radio frequency energy received via antenna 30. The output of filter 44 is above a threshold of transistor 46 if the frequency of the reference signal and the frequency of the signal outputted from comparator 40 are sufficiently different and accordingly, transistor 46 is ON. If the frequency of the output of comparator 40 is substantially equal to a frequency of the reference signal outputted from processor 38, the voltage of filter 44 applied to transistor 46 begins to fall. If such voltage falls below a threshold, such as 0.6 Volts, transistor 46 is provided in an OFF state and the indication signal is asserted. Accordingly, control circuitry 34 including XOR logic device 42, filter 44 and transistor 46 operate to compare a frequency of received radio frequency energy with respect to a frequency of the reference signal outputted from processor 38.

Although not shown in FIG. 3, stimulus device 39 may be coupled with processor 38. In one arrangement, power terminals of stimulus device 39 are coupled with pin P2.4 Output and AGND permitting control of power consumption of device 39 using processor 38. Output of device 39 may be monitored using one or more input pin P1.2 Input, P1.3 Input, P1.5 Input and/or P1.6 Input of processor 38.

Referring to FIG. 4, an exemplary methodology executable by processor 38 is illustrated. Other methods are possible which use more, less or alternative steps.

At a step S10, the processor generates a reference signal having a first frequency, such as 4 kHz. In one configuration, the reference signal is generated following an appropriate wake-up.

At a step S12, the processor monitors for the reception of an indication signal.

If the condition of step S12 is negative, the processor proceeds to a step S14 to increment an enabled watchdog timer.

Thereafter, the processor determines at a step S16 whether a watchdog timeout has occurred. If so, the depicted methodology ends and the processor may return to a lower power mode of operation.

If the condition of step S12 is affirmative, the processor proceeds to a step S18 to implement communications with device 12 including processing first wireless signals 18 and communicating second wireless signals 20, if appropriate.

After step S18, or if the condition of step S16 is negative, the processor proceeds to a step S20 to determine whether a grouping request or command had been received. Alternatively or in addition, the processor could monitor for the presence of a stimulus signal at step S20.

If the condition of step S20 is affirmative, the processor changes a frequency of the reference signal to a second frequency corresponding to another group.

Thereafter, or if the condition of step S20 was negative, the processor returns to step S12 to monitor for the reception of subsequent wireless signals 18 corresponding to the second frequency if step S22 was executed or corresponding to the first frequency if step S22 was not executed.

A plurality of possible applications are described to illustrate how exemplary aspects of the invention are envisioned for use. Exemplary applications illustrate collection, analysis, and reporting of data and information to device 12 using device 14.

A first application includes inventory management. For warehouse applications, a mobile device 12 may be used to pass up and down aisles of the warehouse. One implementation might include a command at a universal walk-up frequency. An exemplary command would cause device 14 to wake-up to a lower-power mode that is a function of a preset aisle number, pallet number, or physical location. Such minimizes the number of devices 14 that are read at a time (i.e., aisles that hear the command), but does not require prior knowledge of a location of device 14. For checkout of an item from a warehouse, a command following a universal wake-up could initiate a transaction. For exemplary process monitoring/tracking, process control and/or diagnostics, the capability to communicate to a single group or plural groups of devices 14 involved in a process could minimize communication and improve process control. For example, assume an accident resulted in medical, firefighting, or other emergency response units to respond and such units are equipped with devices 14. As the devices 14 are queried, a control center could determine who arrived, what capabilities are present, and the qualifications. Devices 14 could be grouped according to a situation even though the physical location need not be adjacent. Similar conditions exist for diagnostics and process control and devices 14 may be queried depending on an overall process condition.

The utilization of a time- (frequency) dependent response as described herein as a security code adds another heightened level of security protection in system 10. In addition, any time that communications frequency is reduced, an opportunity to intercept such communications is reduced.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communications system comprising:
   a reader configured to output a plurality of first wireless signals including different modulation frequencies and to receive a plurality of second wireless signals;
   a plurality of communication devices configured to receive the first wireless signals and to output the second wireless signals using backscatter modulation; and
   wherein the communication devices are individually configured to respond to one of the first wireless signals having a first modulation frequency at a first moment in time and to respond to one of the first wireless signals having a second modulation frequency different than the first modulation frequency at a second moment in time.

2. The system of claim 1 wherein the communication devices are individually configured to not respond to the first wireless signals having the first modulation frequency during the second moment in time.

3. The system of claim 1 wherein the reader is configured to output a predefined first wireless signal having the first modulation frequency during the first moment in time, and the communication devices are individually configured to change from responding to the first wireless signals having the first modulation signal to responding to the first wireless signals having the second modulation frequency responsive to the predefined first wireless signal.

4. The system of claim 1 wherein the communication devices individually comprise a stimulus device, and the communication devices are individually configured to change from responding to the first wireless signals having the first modulation signal to responding to the first wireless signals having the second modulation frequency responsive to the stimulus device.

5. The system of claim 1 wherein the communication devices are individually configured to enable a watchdog timer during the second moment in time and to return to responding to the first wireless signals having the first modulation frequency responsive to the watchdog timer counting a predetermined amount of time.

6. The system of claim 1 wherein the communication devices comprise radio frequency identification devices.

7. The system of claim 1 wherein the communication devices are individually configured to generate a reference signal to control the first wireless signals which are responded to by the respective communication devices.

8. The system of claim 7 wherein the communication devices are individually configured to generate the reference signal having a first frequency during the first moment in time and to generate the reference signal having a second frequency different than first frequency during the second moment in time.

9. The system of claim 1 wherein the reader is configured to control the communication devices to selectively respond to the first wireless signals having the first modulation frequency and the second modulation frequency.

10. The system of claim 1 further comprising a battery configured to provide operational power to the communication circuitry.

11. A radio frequency identification device comprising:
an antenna configured to communicate wireless signals;
radio frequency identification device communication circuitry coupled with the antenna and configured to process a plurality of different first wireless signals received from a reader and to control the outputting of a plurality of second wireless signals to implement radio frequency identifications device communications with the reader; and
wherein the radio frequency identification device communication circuitry is configured to generate a reference signal having a first frequency to control reception of a first type of the first wireless signals and to generate the reference signal having a second frequency different than the first frequency to control reception of a second type of the first wireless signals.

12. The device of claim 11 wherein the communication circuitry is configured to control the outputting of the second wireless signals comprising backscatter modulated signals.

13. The device of claim 11 wherein the communication circuitry is configured to generate the reference signal having the first frequency and the second frequency to control the reception of the first type of first wireless signals having a first modulation frequency and the second type of first wireless signals having a second modulation frequency different than the first modulation frequency.

14. The device of claim 11 wherein the communication circuitry is configured to change the frequency of the reference signal responsive to a reception of a predefined one of the first wireless signals.

15. The device of claim 11 further comprising a stimulus device coupled with the communication circuitry, and wherein the communication circuitry is configured to change the frequency of the reference signal responsive to the stimulus device.

16. The device of claim 11 further comprising a battery configured to provide operational power to the communication circuitry.

17. A wireless communications method comprising:
providing a reader and a plurality of communication devices;
communicating a plurality of different first wireless signals using the reader;
first configuring a plurality of communication devices to respond to a first type of the first wireless signals;
second configuring at least one of the communication devices to respond to a second type of the first wireless signals; and
backscatter modulating radio frequency energy using the communication devices to communicate a plurality of second wireless signals to respond to the first type of the first wireless signals and the second type of the first wireless signals.

18. The method of claim 17 further comprising discovering the communication devices configured to respond to the first type of the first wireless signals using the reader, and wherein the second configuring comprises configuring responsive to the discovering using the reader.

19. The method of claim 17 further comprising receiving a predefined first wireless signal within the at least one communication device, and wherein the second configuring comprises configuring responsive to the receiving.

20. The method of claim 17 wherein the providing comprises providing the at least one of the communication devices comprising a stimulus device, and wherein the second configuring comprises configuring responsive to the stimulus device.

21. The method of claim 17 wherein the providing comprises providing the communication devices comprising radio frequency identification devices.

22. The method of claim 17 wherein the first configuring comprises configuring the communication devices to respond to the first type of the first wireless signals having a first modulation frequency and the second configuring comprises configuring the at least one communication device to respond to the second type of the first wireless signals having a second modulation frequency.

23. A radio frequency identification device communications method comprising:
providing a radio frequency identification device comprising communication circuitry;
receiving a plurality of wireless communications signals within the radio frequency identification device;
providing a clock signal including a frequency using the radio frequency identification device; and
processing the received wireless communications signals using the communication circuitry, the processed wireless communications signals having a modulation frequency corresponding to the frequency of the clock signal.

24. The method of claim 23 wherein the processing comprises processing received wireless communications signals having a modulation frequency substantially equal to the frequency of the clock signal.

25. The method of claim 23 further comprising changing the frequency of the clock signal from a first frequency to a second frequency different than the first frequency.

26. The method of claim 25 wherein the receiving comprises receiving a predefined wireless communication signal, and wherein the changing is responsive to the receiving the predefined wireless communication signal.

27. The method of claim 25 wherein the processing comprises processing received wireless communications signals having a modulation frequency corresponding to the first frequency before the changing and processing received wireless communications signals having a modulation frequency corresponding to the second frequency after the changing.

28. The method of claim 25 wherein the providing the radio frequency identification device comprises providing a device comprising a stimulus device, and wherein the changing is responsive to the stimulus device.

29. The method of claim 23 further comprising disregarding received wireless communications signals having a modulation frequency not corresponding to the frequency of the clock signal.

30. The method of claim 23 further comprising comparing received wireless communications signals with the clock signal, and wherein the processing and the disregarding are responsive to the comparing.

31. The method of claim 23 further comprising backscatter modulating radio frequency energy responsive to the processing to implement return link communications using the radio frequency identification device.

32. The method of claim 23 further comprising providing electrical energy to the communication circuitry using a battery.

33. A radio frequency identification device communications method comprising:
   providing a reader and a radio frequency identification device;
   communicating a plurality of forward link wireless signals using the reader including first wireless signals having a first modulation frequency and second wireless signals having a second modulation frequency;
   receiving the forward link wireless signals using the radio frequency identification device;
   generating a clock signal using the radio frequency identification device and the clock signal having a frequency substantially equal to the first modulation frequency;
   processing a predefined one of the first wireless signals using the radio frequency identification device;
   changing the frequency of the clock signal to a frequency substantially equal to the second modulation frequency using the radio frequency identification device responsive to the processing;
   disregarding others of the received first wireless signals using the radio frequency identification device after the changing;
   processing the received second wireless signals after the changing; and
   outputting a plurality of backscatter modulation signals comprising return link wireless signals using the radio frequency identification device for communication to the reader to implement radio frequency identification device communications.

34. The system of claim 1 wherein the first wireless signals having the different modulation frequencies have the same carrier frequency.

35. The system of claim 4 wherein the stimulus device is configured to monitor an environmental condition about a respective one of the communication devices, and wherein the respective one of the communication devices is configured to change responsive to the monitoring of the environmental condition.

36. The system of claim 35 wherein the environmental condition is exclusive of the first wireless signals.

37. The system of claim 1 wherein the first and the second wireless signals individually comprise radio frequency wireless signals.

38. The system of claim 1 wherein the communication devices individually comprise an antenna configured to at least one of receive the first wireless signals and output the second wireless signals of the respective communication device.

39. The method of claim 17 wherein the backscatter modulating comprises backscatter modulating electromagnetic energy having a frequency in excess of approximately 500 kHz.

40. The method of claim 23 wherein the providing the clock signal comprises providing the dock signal independent of the wireless communications signals.

* * * * *